Feb. 11, 1958 E. C. KASTNER 2,822,991
SERVICING APPARATUS AND CONTROL
Filed Jan. 19, 1955

INVENTOR.
Edward C. Kastner
BY
Attorneys

United States Patent Office 2,822,991
Patented Feb. 11, 1958

2,822,991

SERVICING APPARATUS AND CONTROL

Edward C. Kastner, Akron, Ohio, assignor to Akron Standard Mold Company, Akron, Ohio, a corporation of Ohio Application January 19, 1955, Serial No. 482,901

5 Claims. (Cl. 242—75.47)

This invention relates generally to servicing apparatus for delivering sheet material and more particularly relates to an improved arrangement for controlling such apparatus to prevent distortion of the material during delivery.

The control arrangement of this invention will be described as applied to a tire building servicer apparatus which is adapted to deliver sheet material from a supply roll. In this application it controls delivery of sheet material having a tacky surface, such as rubberized fabric or the like, for use in the manufacture of pneumatic tires; though it will be understood that it may be applied to delivery of any analogous sheet material which is interwound with a backing sheet or liner to keep the convolutions apart. A more complete form of such a tire building servicer apparatus is shown and described in Letters Patent 2,242,810 granted to H. C. Bostwick on May 20, 1941.

A serious problem in servicing apparatus of this and similar types is that the tire building drum which draws the sheet material from the supply roll may cause the material to stretch or otherwise distort in an undesirable manner due to the draw-out tension acting against the cross-grain of the material. Although various attempts have been made to prevent such distortion, none of them have effectively compensated for such variables during operation as changes in the size of the stock delivery and liner receiving rolls. Accordingly, it is a principal object of this invention to provide a servicing apparatus for delivering sheet material without danger of distortion.

A further object of this invention is to provide a tension control mechanism which automatically compensates for changes in the size of the stock delivery and liner receiving rolls as well as changes in the draw-out force acting on the sheet material.

Another object of this invention relates to the provision of a control mechanism which automatically maintains a constant tension on the sheet material as it is delivered from the stock roll and at the same time maintains a constant tension on the liner as it is received by the liner roll.

Briefly, in accordance with this invention there is provided a pair of rolls, one of which carries a supply of tire building sheet material having a tacky surface interwound with a liner which is intended to be wound up on the other roll as the tire building material is drawn off its supply roll by a tire building drum. The liner receiving roll carries a fixed sprocket wheel and another sprocket wheel is rotatably carried by the supply roll, the two sprocket wheels being interconnected by a suitable belt or sprocket chain. A tractor mechanism coacts between the supply roll and the sprocket wheels to place a tension on the liner, and a friction brake coacts between the supply roll and its support to place a tension on the sheet material. The friction brake includes a mechanism which progressively varies the brake action and coacts with the tractor mechanism to compensate for the changing size of the supply and liner rolls and thereby maintains a constant tension on the sheet material and liner during the tire building operation.

Figure 1:
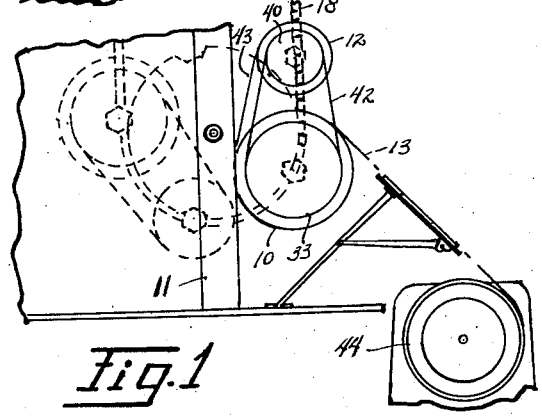
Fig. 1 is a side elevation of the lower portion of a turret on a tire building servicer.

The tire building servicer apparatus to which the control arrangement of this invention is applied is more fully described in the above identified patent as embodying a stock receiving and sheet material feeder turret which is mounted for rotation upon a supporting frame. As is diagrammatically shown in Fig. 1, a plurality of pairs of sheet storing and delivery rolls are carried by the turret frame and are mounted for movement as a unit, the arrangement being such that when the supply rolls are positioned adjacent a discharge or unloading station and are exhausted of their sheet material, the entire multiple roll unit may be positioned to present another set of loaded or charged rolls at the unloading station, while the set of exhausted rolls is moved to a loading or charging station where they may again be filled with the sheet material. Each multiple roll supply unit which is carried by the turret frame carries a plurality of pairs of stock storing and feeding rolls so constructed and arranged as to be shiftable to present pairs of these stock storing rolls successively to a predetermined point adjacent the loading or unloading stations of the servicing apparatus.

Figure 2:
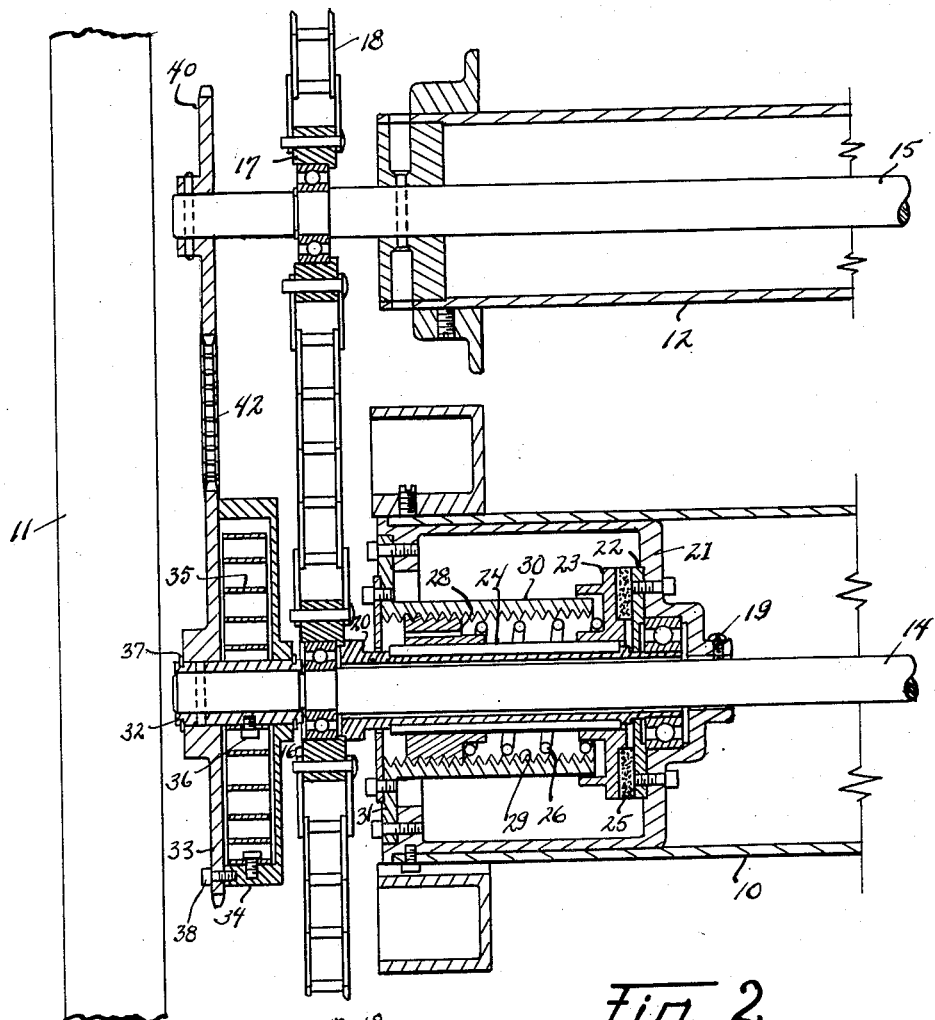
Fig. 2 is a partial sectional view illustrating the arrangement for automatically maintaining a constant tension on the supply and liner roll materials.

In Fig. 2 of the drawings, a portion of only one such pair of stock storing and delivery rolls 10 and 12 is shown relative to a vertical standard 11 of the turret frame. The unit shown comprises horizontally disposed shafts 14 and 15 each mounted for rotation within suitable bearing blocks 16 and 17 respectively. These bearing blocks are spaced from one another for engagement by a sprocket chain 18 which acts to successively position the pairs of rolls in the manner hereinbefore described.

The supply roll 10 is in the form of a hollow drum keyed at 19 to the shaft 14 which in turn is rotatably journaled in a sleeve 20 carried by the sprocket chain 18. One end of the supply roll 10 carries a recessed hub 21 which in turn carries a wear resistant brake surface 22. An annular thrust member 23 is restricted against rotation on the sleeve 20 but is free to slide axially along a key-way 24 secured in the sleeve. This thrust member 23 carries a brake surface 25 having a high coefficient of friction for engagement with the surface 22 and is urged with a substantially constant axial pressure against the surface 22 on the hub 21 by means of a coiled spring 26. The other end of the spring 26 abuts against an annular stop member 28 which is also restricted against rotation about the sleeve 20 by the key-way 24. The stop member 28 has an external thread which engages an internal thread 29 on a surrounding sleeve 30. The sleeve 30 has a flange 31 which is connected to the supply roll 10 so that the sleeve 30 rotates with the supply roll and the shaft 14. The supply roll 10 is rotated about the sleeve 20 while the sheet material 13 is being withdrawn, and the stop member 28 is axially positioned away from the thrust member 23 to progressively relieve the axial force of the spring 26 acting against the thrust member, thereby progressively reducing the brake pressure acting against the surface 22 in direct proportion to the reduction in the torque arm as the sheet material is unwound from the supply roll 10.

One extremity of the supply roll shaft 14 carries a bushing 32 and retaining member 37 which supports a sprocket wheel 33. A sprocket wheel guard casing 34 is connected to the wheel 33 by screws 38 and encloses a tractor mechanism in the form of a spiral spring steel tape 35 which is wound about the shaft 14. The inner end of the spring tape 35 is secured by a pin 36 to the bushing 32 while the outer extremity is secured to the internal periphery of the sprocket wheel. Thus, the spring tape 35 can be wound in the fashion of a clock spring for driving coaction between the supply roll 10 and the sprocket wheel assembly. The liner roll shaft 15 also carries a sprocket wheel 40 which is keyed to the shaft and drivingly coupled to the sprocket wheel 33 through a suitable sprocket chain 42. The spring 35 is designed to provide a loading when wound which will not independently drive both the supply and liner rolls against the opposing action of the compensating friction brake, but which is sufficient to maintain a constant tension on the liner 43 as it passes from the supply roll 10 to the liner roll 12.

With this arrangement, when a pair of stock delivery and liner receiving rolls are positioned at the charging station, the supply roll 10 is loaded with sheet material 13 and the liner 43 is interwound with the sheet material. During the charging operation the sprocket arrangement operates in reverse to wind-up the spring tape 35. When the rolls are positioned at the discharge station, the wound spring coacts with the sprocket wheel assembly to maintain a substantially constant tension on the liner 43 as the sheet material 13 is being supplied to a tire building drum 44. Since, as hereinbefore noted, the spring 35 is designed so that its motive force when wound is insufficient to overcome the friction brake, the sprocket assembly is held fixed through the medium of the liner 43 which has one end engaged by the liner roll 12 while the wound up portion is held fixed with the sheet material 13 on the supply roll 10 through the friction brake. It will be apparent that the compensating mechanism must not only be designed to compensate for the changing torque arm of the wound up sheet material 13, but must also compensate for the differential unwinding action of the spring 35. This can best be accomplished by designing the pitch on the compensating screw sleeve 30 to move the stop member 28 axially at a rate that will compensate for both of these varying conditions.

Thus, there has been provided an improved arrangement for controlling the tension of both the sheet material and its liner as a servicer apparatus supplies the sheet material to a tire building drum. The arrangement includes a compensating friction brake mechanism which coacts with a spring to automatically maintain a substantially constant tension on the sheet material and its liner as the material is unwound from its supply roll and the liner is wound onto the liner storage roll. This improved compensating arrangement provides an optimum control for a tire building servicer which prevents the thread bias of the tire building material from skewing or otherwise distorting as it is fed to a tire building apparatus.

I have shown and described what I consider to be the preferred embodiment of my invention, along with suggested modified forms, and it will be obvious to those skilled in the art that other changes and modifications may be made without departing from the scope of my invention as defined by the appended claims.

I claim:

1. In a tire building apparatus having a support carrying a supply roll of sheet material interleaved with a liner sheet and a liner receiving and storing roll each mounted respectively on spaced parallel shafts rotatably journaled in the support, friction means carried by one of said rolls for coaction between the support and the supply roll to place a tension on the sheet material as it is withdrawn from the roll, tractor means coacting with said friction means between the supply and liner rolls to place a tension on the liner as it is wound onto the liner roll, and compensating means automatically coacting between said friction and tractor means in response to the changing size of the supply and liner rolls to progressively vary the brake and tractor actions in a manner to maintain a substantially constant tension on the sheet material and liner during the tire building operation.

2. In a tire building apparatus having a support carrying a supply roll of sheet material interleaved with a liner sheet and a liner receiving and storing roll each mounted respectively on spaced parallel shafts rotatably journaled in the support, friction means carried by the supply roll and adapted to place a tension on the sheet material as it is withdrawn from the supply roll, said friction means including a thrust member supported for movement along the axis of the supply roll and restrained against rotation, resilient means for urging said thrust member into frictional engagement with one end of said supply roll, a sleeve carried by the supply roll with its axis coincident with the axis of the roll, said sleeve having an internal thread, a stop member supported for axial movement within the sleeve and restrained against rotation, said stop member having an external thread engaging the internal sleeve thread whereby the stop member is positioned axially in response to rotation of the supply roll and sleeve, said resilient means coacting between the stop member and the thrust member to maintain a substantially constant tension on the sheet material as it is withdrawn from the supply roll, and tractor means coacting with said friction means between the supply and liner rolls to maintain a substantially constant tension on the liner as it is wound onto the liner roll.

3. In a tire building apparatus having a support carrying a supply roll of sheet material interleaved with a liner sheet and a liner receiving and storing roll each mounted respectively on spaced parallel shafts rotatably journaled in the support, friction means carried by one of said rolls for coaction between the support and the supply roll to maintain a substantially constant tension on the sheet material as it is withdrawn from the roll, and tractor means including a pair of interconnected wheels with one fixed on the liner roll shaft and the other rotatably mounted on the supply roll shaft, and a spring motor mounted for driving coaction between the supply roll shaft and the supply roll wheel to maintain a substantially constant tension on the liner as it is unwound from the supply roll onto the liner roll.

4. In a tire building apparatus having a support carrying a supply roll of sheet material interleaved with a liner sheet and a liner receiving and storing roll each mounted respectively on spaced parallel shafts rotatably journaled in the support, friction means carried by one of said rolls for coaction between the support and the supply roll to maintain a substantially constant tension on the sheet material as it is withdrawn from the roll, and tractor means including a pair of wheels, one of said wheels being fixed on the liner roll shaft and the other wheel being rotatably mounted on the supply roll shaft, a spring tape having one end fixed to the supply roll shaft and having the other end wound spirally about the shaft and connected to a peripheral portion of the corresponding wheel, and flexible means interconnecting the wheels for unitary movement in the same direction to impart the spring tension to the liner, said spring tape and interconnected wheels coacting with said friction means to maintain a substantially constant tension on the liner as it is unwound from the supply roll onto the liner roll.

5. In a servicer for a tire building apparatus the combination comprising, a support, a shaft rotatably journaled in the support, a drum fixed on the shaft and adapted to support interwound layers of liner and tire building sheet material, and automatically compensating friction means carried by said drum and coacting between the support and the drum to control rotation of the drum in a sheet material unwinding direction and thereby maintain a substantially constant tension on the sheet material as it is withdrawn from the drum, said means including a sleeve extending into and carried by the drum concentric with the drum axis and rotatable therewith, said sleeve having an internal thread, a portion of said support extending axially into said sleeve, a stop member supported for axial movement along said portion of the support and restrained against rotation, said stop member having an external thread engaging the internal sleeve thread, whereby the stop member is positioned axially in response to rotation of the drum and sleeve, a thrust member supported for axial movement along said portion of the support intermediate said stop member and the drum and also restrained against rotation, and resilient means coacting between said stop and thrust members to urge the thrust member into engagement with the drum, the engaging portion of said thrust member having a brake surface with a high coefficient of friction for coaction with the drum.

References Cited in the file of this patent

UNITED STATES PATENTS

| | | |
|---|---|---|
| 1,469,284 | Strawn | Oct. 2, 1923 |
| 1,868,915 | Richardson | July 26, 1932 |
| 2,045,534 | Stevens | June 23, 1936 |
| 2,462,766 | Olson et al. | Feb. 22, 1949 |